United States Patent
Loewe et al.

(10) Patent No.: US 11,161,078 B2
(45) Date of Patent: Nov. 2, 2021

(54) DISPOSABLE FILTRATION DEVICE

(71) Applicant: SARTORIUS STEDIM BIOTECH GMBH, Goettingen (DE)

(72) Inventors: Thomas Loewe, Goettingen (DE); Sebastian Handt, Goettingen (DE); Wilhelm Requate, Heiligenstadt (DE); Gerid Hellwig, Niemetal (DE); Andre Dell, Gieboldehausen (DE); Thomas Friese, Bleicherode (DE)

(73) Assignee: SARTORIUS STEDIM BIOTECH GMBH, Goettingen (DE)

( * ) Notice: Subject to any disclaimer, the term of this patent is extended or adjusted under 35 U.S.C. 154(b) by 115 days.

(21) Appl. No.: 15/752,663

(22) PCT Filed: Aug. 1, 2016

(86) PCT No.: PCT/EP2016/068338
§ 371 (c)(1),
(2) Date: Nov. 6, 2018

(87) PCT Pub. No.: WO2017/032560
PCT Pub. Date: Mar. 2, 2017

(65) Prior Publication Data
US 2019/0083936 A1 Mar. 21, 2019

(30) Foreign Application Priority Data
Aug. 24, 2015 (DE) .................... 10 2015 114 004.7

(51) Int. Cl.
*B01D 63/06* (2006.01)
*B01D 65/02* (2006.01)
(Continued)

(52) U.S. Cl.
CPC .......... *B01D 63/06* (2013.01); *B01D 35/303* (2013.01); *B01D 46/0005* (2013.01);
(Continued)

(58) Field of Classification Search
CPC .. B01D 63/06; B01D 46/2407; B01D 46/008; B01D 35/303; B01D 46/2411;
(Continued)

(56) References Cited

U.S. PATENT DOCUMENTS 6,454,941 B1 * 9/2002 Cutler .................... C02F 1/003
                                                           210/266
9,669,333 B2     6/2017 Leuthold et al.
(Continued)

FOREIGN PATENT DOCUMENTS

NL    2003669 C      4/2011
WO    9116124 A1    10/1991
(Continued)

*Primary Examiner* — Madeline Gonzalez
(74) *Attorney, Agent, or Firm* — McNees Wallace & Nurick LLC

(57) ABSTRACT

A disposable filtration device includes a plurality of disposable filter capsules connected with each other by lines, which are carried by a rigid holder. At least the holder and the lines between the filter capsules preferably are formed of a sterilizable material, so that the filtration device can be sterilized in the pre-mounted, i.e. ready-to-connect condition, and can be packed and transported without a risk of damage.

19 Claims, 3 Drawing Sheets

(51) Int. Cl.
  *B01D 46/00* (2006.01)
  *B01D 46/24* (2006.01)
  *B01D 35/30* (2006.01)

(52) U.S. Cl.
  CPC ....... *B01D 46/008* (2013.01); *B01D 46/2407* (2013.01); *B01D 46/2411* (2013.01); *B01D 65/022* (2013.01); *B01D 2201/4023* (2013.01); *B01D 2313/06* (2013.01); *B01D 2313/13* (2013.01); *B01D 2313/16* (2013.01); *B01D 2313/44* (2013.01); *B01D 2313/54* (2013.01); *B01D 2313/58* (2013.01); *B01D 2317/04* (2013.01); *B01D 2317/06* (2013.01); *B01D 2321/32* (2013.01); *B01D 2321/346* (2013.01)

(58) Field of Classification Search
  CPC .............. B01D 46/0005; B01D 65/022; B01D 2201/4023; B01D 2321/346; B01D 2321/32; B01D 2317/06; B01D 2317/04; B01D 2313/58; B01D 2313/54; B01D 2313/44; B01D 2313/16; B01D 2313/13; B01D 2313/06

USPC .... 210/323.1, 322, 330, 340, 436, 455, 472, 210/120, 180, 181, 188, 218, 249, 256
  See application file for complete search history.

(56) References Cited

U.S. PATENT DOCUMENTS

| | | |
|---|---|---|
| 2005/0035048 A1* | 2/2005 | Chancellor .......... B01D 61/022 210/321.89 |
| 2006/0186032 A1 | 8/2006 | Camilli et al. |
| 2013/0327691 A1* | 12/2013 | Burbank ................... C02F 1/44 210/136 |
| 2015/0108050 A1 | 4/2015 | Maggiore et al. |

FOREIGN PATENT DOCUMENTS

| | | |
|---|---|---|
| WO | 03031020 A1 | 4/2003 |
| WO | 2008071516 A1 | 6/2008 |
| WO | 2010009518 A1 | 1/2010 |
| WO | 2011130617 A2 | 10/2011 |
| WO | 2013117344 A2 | 8/2013 |

* cited by examiner

DISPOSABLE FILTRATION DEVICE

TECHNICAL FIELD OF THE INVENTION

This invention relates to a disposable filtration device which is suitable in particular for large-volume filtration processes.

BACKGROUND OF THE INVENTION

In the pharmaceutical production of high-quality active ingredients single-use processes generally are used to an increasing extent due to the high flexibility achievable therewith, and due to the saving of time, investments and operating expenditure such as the cleaning, validation and examination of such ingredients. Single-use systems ("disposables") are desired for a larger scale, wherein the costs for such systems should not rise to an unrealistic extent.

In processes with bioreactors, which now also are available as disposable reactors in sizes of 500, 1000 and 2000 liters, there is a demand for media filtration and the post-harvest filtration of process streams with a total volume of several 1000 liters with high blocking tendency. Such large-scale filtration processes with total filter surfaces of up to 50 $m^2$ currently are carried out with devices in which filter candles in stainless steel housings are used. The devices hence still are designed for reuse ("reusable"). This involves disadvantages such as low flexibility, high cleaning expenditure etc. Corresponding single-use solutions are not available in this order of magnitude.

In principle, individual small disposable filter capsules with a maximum filter surface of 3 $m^2$ each can be connected by means of clip systems or several such filter capsules can be connected with hoses and distributors. However, larger systems formed in this way neither are handleable nor can they be arranged in a way suitable for production without any major expenditure. In addition, there is no possibility to arrange such system such that a satisfactory venting and drainage can be effected. This will be explained in more detail below.

When a plurality of filter capsules is connected with each other by means of hoses, an unstable formation is obtained in general. There is a risk that during packaging, storage, unpacking and set-up, individual parts of the device move in an uncontrolled way, which e.g. can lead to hoses being torn off or to an undesired contact with other parts (including a film packaging serving as sterility barrier). This risk of possible damages can only partly be countered with expensive packaging solutions. The handling of the device remains difficult in any case, as it is not possible to move all filter capsules at the same time and in a controlled way and to bring them into the future position of use. It must rather be ensured that one filter capsule after the other can be unpacked and positioned. This requires quite considerable hose lengths between the filter capsules, in order to provide for an in so far independent handling of the individual filter capsules. A reduction of the hose lengths only would be possible when the device is supplied in individual parts. Apart from an increased set-up expenditure as such, there also is the fundamental risk in this case that the device is assembled incorrectly or wrongly (leaky connections) or that parts of the device are damaged or contaminated during set-up.

It has also been recognized that filter capsules connected with long hoses have one more serious disadvantage. In pharmaceutical single-use processes a very high interest to optimally drain the process plants exists in general, as the product solutions to be filtered generally have a value between 500 and 5000 EUR per liter. After processing, a plant usually is "pressed empty" with sterile compressed air or nitrogen from the input side, i.e. so much left product solution as possible is pressed through the plant with a gas into a container arranged behind the same. When the process plant contains membrane filter stages, the gas can press the product solution to the next membrane. However, the gas cannot pass the microporous membrane, as the product solution is held in the pores of the membrane by capillary forces. It therefore is advantageous to provide as little 'dead volume' as possible behind the membrane in each filter stage of the process plant. The product solution within this dead volume cannot be pressed out by means of the gas pressure applied on the input side.

It is the object of the invention to provide a flexible, pre-sterilizable ready-to-connect and—as far as possible in principle—integrity-testable filtration system which with all product-contacting components can be used once and subsequently can be exchanged quickly.

SUMMARY OF THE INVENTION

According to the invention, the disposable filtration device comprises a plurality of disposable filter capsules which are connected with each other by lines. The filter capsules are carried by a rigid holder.

The invention is based on the finding that a rigid holder for the filter capsules provides for a considerably facilitated handling of the entire filtration device and also offers a transport lock. In contrast to loose filter capsules, which before delivery were connected with each other by hose lines, or individual filter capsules which are connected with each other only at the site of use, the filtration device according to the invention can be delivered in a form configured already ready for connection and set up. In addition, the filtration device according to the invention for the first time provides for a single-use solution for large-scale filtration processes. The device can be pre-sterilized as a whole in the pre-mounted condition and after the single use can be exchanged as a whole within a minimum of time. Hence, it is not necessary that components of the device are mounted, sterilized and removed again individually, so that the device in general is extremely flexible to use.

To allow the pre-mounted filtration device to be sterilized without great expenditure, at least the holder and the lines between the filter capsules should be formed of a sterilizable material. This means that the holder with the filter capsules and lines mounted therein can be sterilized in one step. Corresponding to the proven sterilization methods, the material preferably should be sterilizable by gamma rays or hot steam. The formation of all the aforementioned components of the same material as far as possible is particularly advantageous. In this case, fulfilling and maintaining the formal requirements and provisions with respect to the sterilization is simplified as compared to a filtration device in which many different materials are used.

Preferably, at least the holder and the lines between the filter capsules are made of an autoclavable material. After the single use of the filtration device the same or its essential components can then be prepared for a new use, without having to disassemble the device into individual parts.

With regard to the drainage and venting of the filter capsules used in the device it is desirable that the filter capsules are standing upright in their position of use, which is made possible by the rigid holder of the device.

With an upright position of all filter capsules of the device a central air filter 25 optionally can be provided for venting the entire unit of the filter capsules. This means that the venting of all filter capsules can be carried out at a single point.

With an upright position of all filter capsules it also is possible to drain the same in their entirety at a deepest point. At this point, a central collection device can be arranged for drainage.

In particular, with an upright position of the filter capsules standing feet are advantageous, on which the entire device can stand safely and stably in a predetermined position. Inadvertent tipping over of the device then is excluded.

For the packaging, transport and storage of the filtration device according to the invention an embodiment is advantageous in which the holder protrudes beyond the filter capsules and the lines in all directions. By its outside dimensions, the holder then defines e.g. a virtual cube, cuboid or some other three-dimensional shape, within which the sensitive components of the device are protected. The oversize of the holder ensures that the device can be put onto a flat surface in every possible position, without any parts protruding therefrom and being damaged.

The rigid holder of the filtration device according to the invention advantageously can be used as a framework for a film wrapping of the device, in particular when the holder protrudes beyond the components of the device. Then, there is no risk that during film wrapping and later on during the transport or storage of the device the film is damaged. This is particularly important when the device is pre-mounted and pre-sterilized, as the film serves to protect against soiling and in particular should by no means be damaged when used as sterility barrier. Due to the special holder, the device thus can be wrapped with film already in the clean room.

The holder preferably comprises at least two opposed side walls which are connected with each other by transverse struts on which holding means for the individual filter capsules are provided. Although of course other designs of the holder also are possible, the design with two opposed side walls allows an easy access to the filter capsules. As holding means for the filter capsules receptacles in the transverse struts, clamps or similar devices can be used, which ensure safe and reliable holding of the filter capsules without there being a risk of the filter capsules falling out or tipping over.

These holding means also can be provided with elastic materials, in order to ensure impact and vibration damping during the transport and also during the operation.

For use in a large-volume filtration process with several thousand liters a construction with at least six filter capsules in a standard size of at least 30" is recommendable, which are arranged in a specified grid.

The flexibility of the filtration device according to the invention can be increased even further by a sterilizable packaging. The device along with the packaging can be stored at the user in the sterilized condition and, if necessary, can be unpacked, set up and put into operation within a minimum of time.

Preferably, the filtration device in its entirety defines a measure which is suitable for transport on standard Euro pallets (EN 13698-1).

According to a particular aspect of the invention the lines between the filter capsules at least for the most part are formed as rigid conduits. Due to the fixed positions of the individual filter capsules in the rigid holder, the lines also can be rigid, as the filter capsules cannot move relative to each other. Rigid conduits as compared to flexible hose lines have the advantage that they cannot get entangled and cannot be kinked. Resulting damages of the lines thus are excluded and process risks, such as unwanted rises in pressure and leakages resulting therefrom, can drastically be minimized by using rigid conduit systems. In addition, the rigid conduits can contribute to the entire stability of the filtration device. The conduits should have a diameter sufficient for the fluid streams to be expected in operation and in so far be pressure-stable, so that they can withstand the pressures typically occurring in the filtration processes.

In this connection it should be noted that hoses with an inside diameter of 1" (25.4 mm) typically only are safe up to about 3 bar or maximally 3.5 bar and can be used without a risk of leakage. The pressures necessary for certain filtration processes and also for the integrity tests however reach up to 5 bar. Fixed conduits thus are the only connection possibility for large systems operating with large line diameters (1" inside diameter and greater) and must ensure a reliable operating pressure of more than 3.5 bar up to at least 5 bar.

As an alternative to the conduits, the lines between the filter capsules at least for the most part can also be formed by several uniform inflow and outflow units. The uniform inflow and outflow units thus can be adjusted to the size and the design of the filter capsules, so that several identical or also different filter capsules can be joined to one unit in any combination. When using the inflow and outflow units, no additional conduits are necessary between the filter capsules. The filtration device thereby can be constructed more compact, so that the holder also can be smaller. In generally, space hence can be saved, which in particular is advantageous for storage and transport.

Preferably, the inflow and outflow units each include an inflow device and an outflow device, which are connected with an end-face inflow and an opposite end-face outflow of an associated filter capsule. The two devices of the inflow and outflow unit hence are mounted directly on the respective filter capsule, so that no separate holding means, such as for the conduits, are necessary.

What is particularly inexpensive in its manufacture and advantageous in terms of logistics is an embodiment of the inflow and outflow unit in which the inflow device and the outflow device at least for the most part are constructed identically. It thereby is possible to use a universal component either as inflow device or as outflow device. Otherwise, various components would be necessary, which would have to be differentiated corresponding to their intended use (inflow device or outflow device).

The inflow device and the outflow device can be connected with each other by a housing wall. The associated filter capsule in this case is accommodated in a housing which laterally is defined by the circumferential housing wall and thereby is protected against external influences.

The individual filter capsules easily can be joined to one unit by connection components, such as tube connecting clamps, which are mounted on external connections of the inflow and outflow units.

BRIEF DESCRIPTION OF THE DRAWINGS

Further features and advantages of the invention can be taken from the following description and from the attached drawings to which reference is made. In the drawings.

DETAILED DESCRIPTION OF THE PREFERRED EMBODIMENTS

Figure 1:
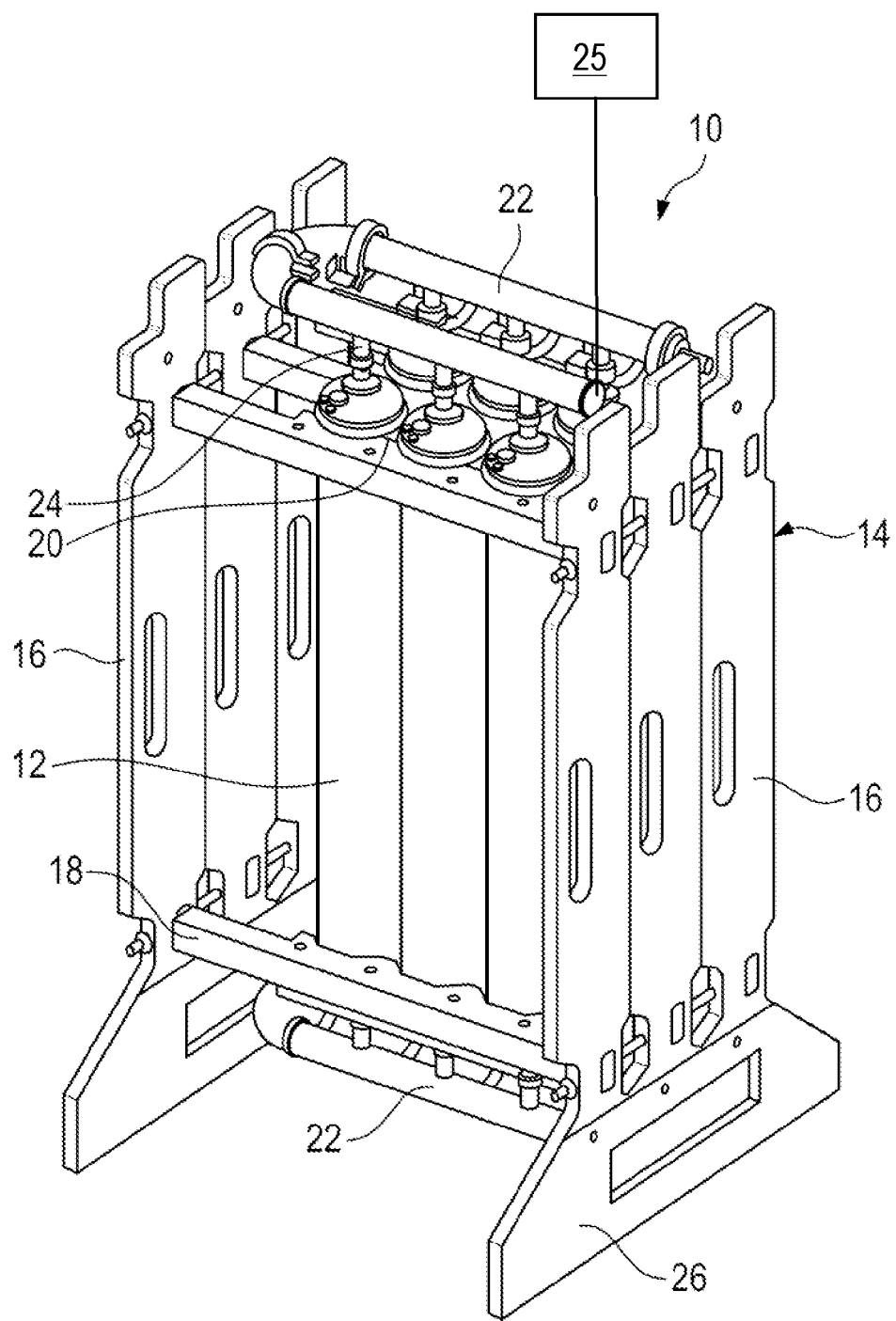
FIG. 1 shows a perspective view of a first embodiment of the disposable filtration device according to the invention.
Figure 2:
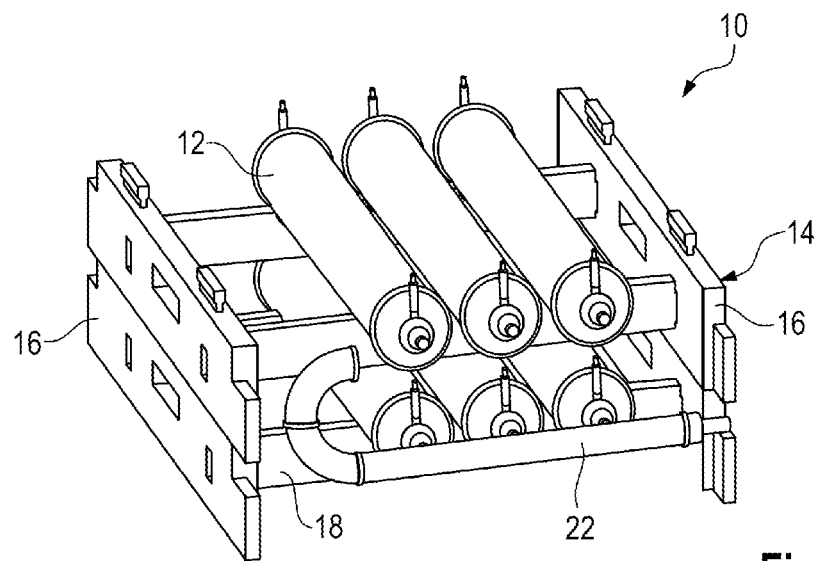
FIG. 2 shows a perspective view of a second embodiment of the disposable filtration device according to the invention.

The embodiments of the disposable filtration device 10 as shown in FIGS. 1 and 2 are based on a proven type of disposable filter capsules 12 of the standard size 30" (76.2 cm). In principle, another type of filter capsule can of course also be used. It is also possible to use different types of filter capsules within the same device, as far as this is regarded as expedient. The remaining components of the device in these cases correspondingly are to be adapted to the dimensions of the filter capsules.

The filter capsules 12 are held in position in a specified arrangement by a rigid holder 14. In the exemplary embodiment shown in FIG. 1, six filter capsules 12 are arranged upright in a 3×2 grid. Other grids with more or less filter capsules 12 are of course also possible, wherein arrangements as compact as possible are preferred. The holder 14 comprises at least two opposed side walls 16 which are connected with each other by transverse struts 18. On the transverse struts 18 holding means 20 for the individual filter capsules 12 are provided. The holding means 20 are provided with elastic materials. Both during the transport and during the operation of the filtration device 10 impact and vibration damping thereby is available for the filter capsules 12.

The filter capsules 12 are completely or at least for the most part connected with each other by rigid, pressure-stable conduits 22. The course of the conduits 22 is determined by the intended operation of the filtration device (parallel or series connection of the filter capsules 12), wherein the conduits 22 include the necessary branches 24 to the individual filter capsules 12. As far as necessary, the conduits 22 are attached to the holder 14.

The essential components of the rigid holder 14, the rigid housings of the filter capsules 12 and the rigid conduits 22 all are preferably formed of the same material. This material and possibly further materials which are used in the device 10 (e.g. for possible flexible hose lines) are sterilizable, in particular by means of gamma radiation, and autoclavable after the single use.

The side walls 16 of the holder 14 are designed such that they protrude beyond the filter capsules 12 and all further critical components. This means that the side walls 16 at least are higher and broader than the entire height or width of the remaining rigid components of the device 10 and that possible flexible components, such as connection tube lines, can be fixed within the volume defined by the side walls 16. It thereby is ensured that during packaging, transport, storage, preparation, post-processing and generally during each handling the device 10 can be placed on a flat surface in every possible position, without there being a risk that protruding parts are damaged or product solution flows out.

In the exemplary embodiment shown in FIG. 1 the side walls 16 have standing feet 26, on which the entire device 10 can stand safely and stably in a predetermined position. This position corresponds to the operating position in which the filter capsules 12 all are standing upright.

Furthermore, due to their dimensions the side walls 16 provide for simplified packaging of the device 10 in a film (not shown) which serves as sterility barrier. The device 10 can simply be wrapped with film already in the clean room, or a film bag can be stretched around the side walls 16, wherein it automatically is ensured that no hard or sharp-edged parts of the device can get in contact with the film, as the same all are immovably arranged within the volume defined by the side walls 16 and are immovable.

The filtration device 10 can be sterilized and packed in the pre-mounted, i.e. ready-to-connect condition. In particular, the entire device 10 can be gamma-sterilized before shipment on one or several Euro pallets with little packaging and cushioning expenditure (only a thin foam pad and a cardboard packaging are necessary), or the entire device 10 is sterilized with hot steam without cardboard and pallet packaging. Storage and disposition can be effected in the completely sterilized condition of the device 10 at the customer or manufacturer, so that the device 10 can be dispatched and be put into operation within a minimum of time. Before and after the single use, only one single integrity test each is necessary, in case such examination is intended.

FIG. 2 by way of example shows a lying variant of the filtration device 10, wherein some of the conduits 22 have been omitted for better clarity. Here as well, the filter capsules 12 are arranged between side walls 16, which are connected with each other by transverse struts 18. In this variant, no separate standing feet are provided, as the device 10 can stand well on the long sides of the side walls 16. Otherwise, the embodiment of FIG. 2 substantially corresponds to the embodiment of FIG. 1, so that the same advantages apply, in particular with respect to packaging, sterilization and set-up.

The standing variant of the filtration device as shown by way of example in FIG. 1 however is even more superior to the lying variant with regard to the product recovery after the end of the actual filtration process. In the following, the improved product recovery will be described in more detail with reference to a concrete comparison between a non-inventive filtration device 10' and a filtration device 10 according to the invention.

Figure 3:
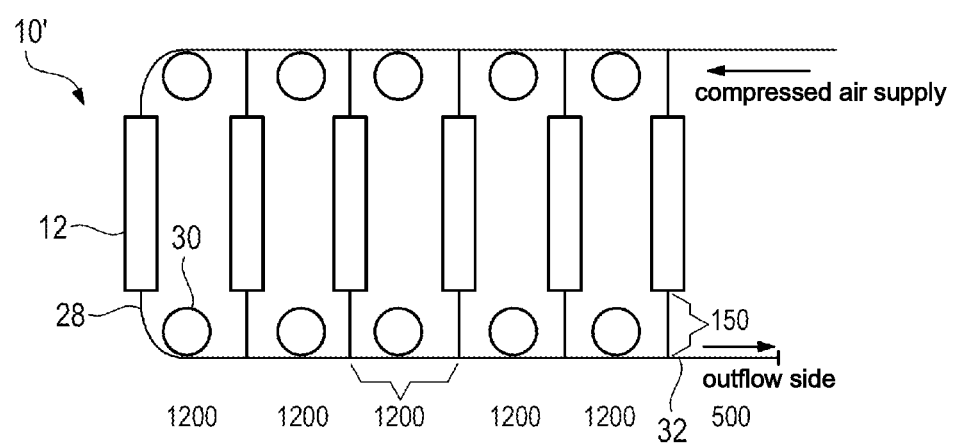
FIG. 3 shows a schematic representation of a non-inventive disposable filtration device and an inventive disposable filtration device in a top view.
Figure 3:
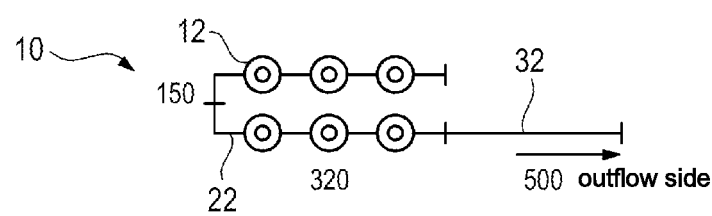

FIG. 3 at the top symbolically shows a non-inventive filtration device 10' with six 30" filter capsules 12, which by means of flexible hoses 28 are connected to a closed system. For the application process such device is closed at the inflow and outflow ends and delivered packed in bags and cardboard boxes and sterilized with gamma radiation. To effectively and safely pack the filter capsules 12 connected in parallel by hose lines, to provide for a reasonable handling and in the extreme case a vertical assembly on additional separate holders and to be able to transport and handle the flexible, kinking-sensitive hoses 28 free from damage, a minimum hose length of 1,200 mm must be provided between the individual filter capsules 12. This is necessary in particular to be able to lay the hoses 28 in circles 30 to avoid kinking.

The addition of the hose lengths only on the outflow side including an outflow hose 32 with a length of 500 mm results in 7,250 mm. At an assumed inside diameter of 1" (25.4 mm) for all hoses 28 this means a calculatory dead volume of 3,674 cm$^3$, at a likewise still sufficient inside diameter of ¾" (19.05 mm) still 2,066 cm$^3$. When the filter capsules 12 are inserted horizontally in the simplest case, it should also be taken into account that the product solution cannot completely be pressed out of the outer housing of the filter capsules 12 through the inner cylindrical membrane filters. In addition, 6×720 cm³, i.e. altogether 4,320 cm³, remain in the outer housings.

For comparison, FIG. 3 at the bottom shows a filtration device 10 constructed according to the invention with likewise six 30" filter capsules 12, which are arranged in a parallel connection. This device surprisingly can do with a tube length on the outflow side of only 790 mm (320 mm+320 mm+150 mm). For technical reasons, however, a larger inside diameter of 38 mm is required, so that on the outflow side a calculatory dead volume of 896 cm³ is present, plus 253 cm³ for the drain hose 32 used analogous to the above example with a length of 500 mm and an inside diameter of 1". As the device 10 according to the invention preferably is designed for the advantageous operation with standing filter capsules 12, the amount of 4,320 cm³ of product solution is not applicable either in this case, which in the case of lying filter capsules 12 would remain in the outer housing.

Thus, according to this example, a reduction of the product loss by about 86% optimally can be achieved with the device 10 according to the invention (about 1,150 cm³ as compared to about 8,000 cm³). Even if the non-inventive device 10' is operated with standing filter capsules 12 and a hose diameter of only ¾" (19.05 mm), there still is obtained a reduction of the product loss by about 44% (about 1,150 cm³ as compared to 2,066 cm³).

In principle, the conduits 22 need not necessarily have a circular cross-section. Rather, other shapes (e.g. oval) and other sizes than those indicated above also are possible. This also applies for the connections of the embodiment described below.

Figure 4:
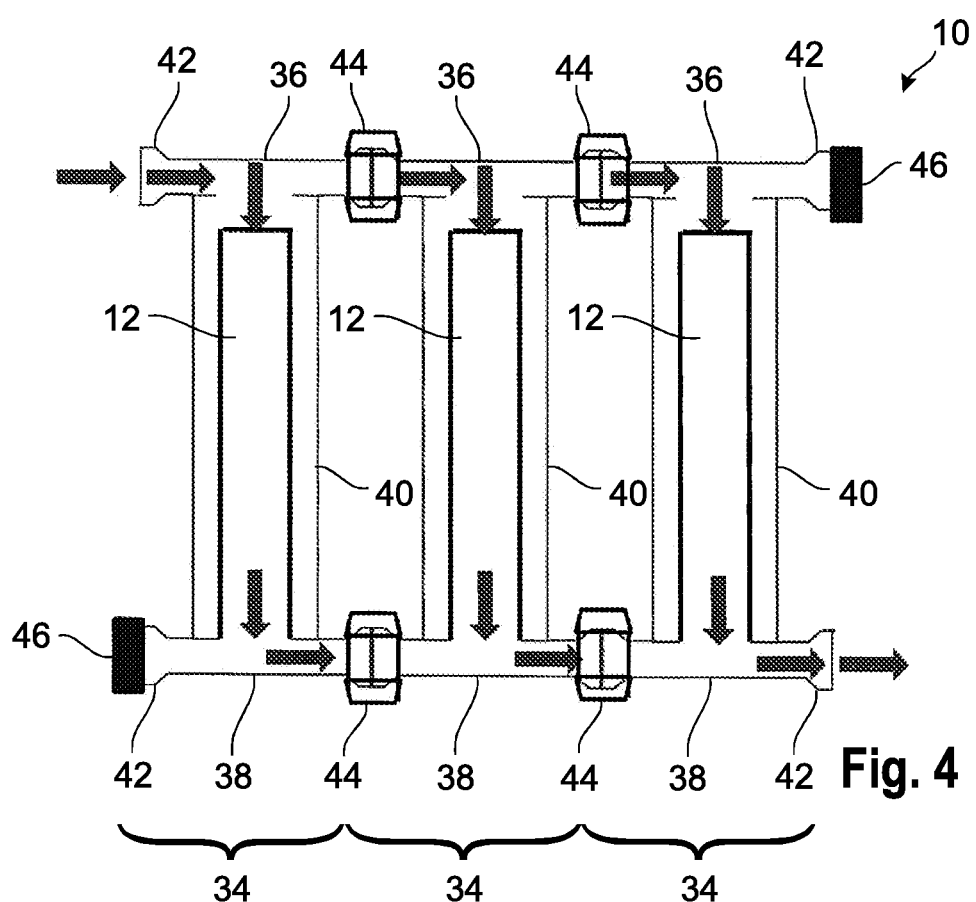
FIG. 4 shows a schematic representation of a third embodiment of the disposable filtration device according to the invention without holder.
Figure 5:
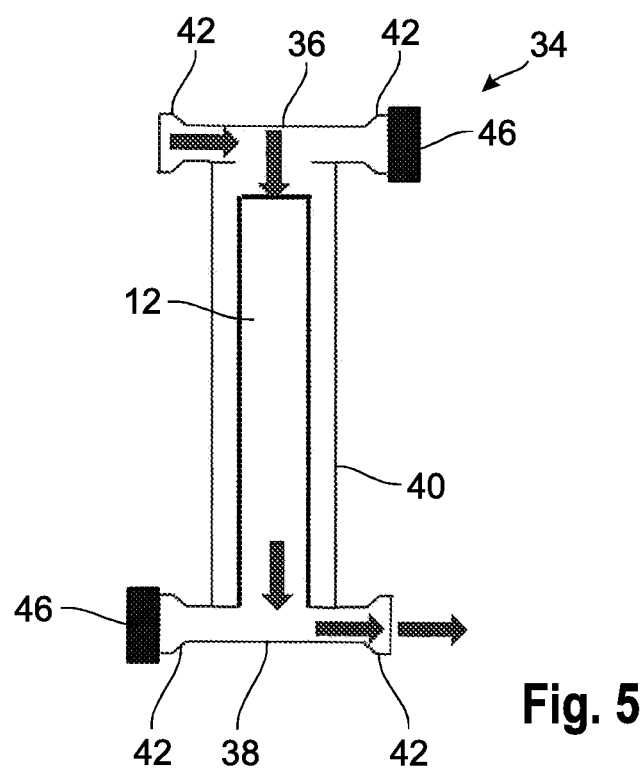
FIG. 5 shows an individual inflow and outflow unit of the third embodiment of the disposable filtration device according to the invention.

FIG. 4 schematically shows another embodiment of the filtration device 10 according to the invention, but without the associated holder 14. The particularity of this embodiment is the tubing of the filter capsules 12. Instead of the conduits 22 and branches 24 rigid, uniform inflow and outflow units 34 of gamma-sterilizable plastic material are provided here. FIG. 5 shows such inflow and outflow unit 34 each separately. For each filter capsule 12 a separate inflow and outflow unit 34 with an inflow device 36 and an outflow device 38 is provided, which are adjusted to the end-face inflow and outflow connections of the respective filter capsule 12. The inflow device 36 and the outflow device 38 are constructed either completely identical or at least largely identical.

Between the inflow device 36 and the outflow device 38 connecting struts or a housing wall 40 extend, in order to connect the two devices with each other. In the latter case, the filter capsules 12 are surrounded by the completely circumferential housing wall 40 and thereby protected against external influences.

Both the inflow device 36 and the outflow device 38 each include two opposite external connections 42. By suitable connection components 44, such as TRI clamp connections, several inflow and outflow units 34 can aseptically be connected with each other. An inflow-side external connection 42 of a filter capsule 12 is connected with an inflow-side external connection 42 of an adjacent filter capsule 12. An outflow-side external connection 42 of the one filter capsule 12 likewise is connected with an outflow-side external connection 42 of the adjacent filter capsule 12. In each case, seals are to be provided between the connections. In this way, any number of filter capsules 12 can be joined for a parallel approach flow. The external connections 42 not needed are aseptically sealed by suitable closures 46. These closures 46 or also blind caps likewise are mounted by means of suitable connection components 44.

The inflow and outflow unit 34 can be formed integrally, as a kit or as prefabricated unit. In particular, several inflow devices 36 and/or outflow devices 38 can be formed integrally or be pre-mounted, before they are mounted on the filter capsules 12.

LIST OF REFERENCE NUMERALS 10 disposable filtration device
12 filter capsule
14 holder
16 side wall
18 transverse strut
20 holding means
22 conduit
24 branch
26 standing foot
28 hose
30 circle
32 drain hose
34 inflow and outflow unit
36 inflow device
38 outflow device
40 housing wall
42 external connection
44 connection component
46 closure

The invention claimed is:

1. A disposable filtration device, comprising a plurality of disposable filter capsules connected with each other by lines, which are carried by a rigid holder and a single central air filter fluidically coupled to the filter capsules and configured to allow venting an entire unit of filter capsules through the single central air filter, wherein the disposable filtration device is limited to a single use, and wherein the disposable filtration device is sterilized prior to the single use, wherein the holder comprises a first pair of opposed side walls and a second pair of opposed side walls, each of the first pair of opposed side walls and the second pair of side walls is connected with each other by a first transverse strut near corresponding first ends of the opposed side walls and by a second transverse strut near corresponding second ends of the opposed side walls, holding means formed in each of facing surfaces of a corresponding pair of first transverse struts and of a corresponding pair of second transverse struts defining opposed surfaces partially surrounding and contacting only opposed lateral portions of each of the filter capsules for securing the filter capsules positioned between the corresponding pair of first transverse struts and the corresponding pair of second transverse struts thereby.

2. The disposable filtration device according to claim 1, wherein at least the holder and the lines between the filter capsules are formed of a gamma-sterilizable material.

3. The disposable filtration device according to claim 2, wherein at least the holder and the lines between the filter capsules are made of an autoclavable material.

4. The disposable filtration device according to claim 3, wherein the filter capsules are standing upright in their position of use.

5. The disposable filtration device according claim 1, wherein the filtration device in its entirety defines dimensions which are suitable for transport on standard Euro pallets.

6. The disposable filtration device according to claim 1, wherein the plurality of disposable filter capsules are configured to allow venting an entire unit of filter capsules through the central air filter at a single point.

7. A disposable filtration device, comprising a plurality of disposable filter capsules connected with each other by lines, which are carried by a rigid holder and a single central collection device being configured to facilitate a drainage of an entire unit of filter capsules after a filtration process; wherein the filter capsules are standing upright in their position of use, wherein the disposable filtration device is limited to a single use, and wherein the disposable filtration device is sterilized prior to the single use; wherein the holder comprises a first pair of opposed side walls and a second pair of opposed side walls, each of the first pair of opposed side walls and the second pair of side walls is connected with each other by a first transverse strut near corresponding first ends of the opposed side walls and by a second transverse strut near corresponding second ends of the opposed side walls, holding means formed in each of facing surfaces of a corresponding pair of first transverse struts and of a corresponding pair of second transverse struts defining opposed surfaces partially surrounding and contacting only opposed lateral portions of each of the filter capsules for securing the filter capsules positioned between the corresponding pair of first transverse struts and the corresponding pair of second transverse struts thereby.

8. The disposable filtration device according to claim 7, further comprising standing feet on which the entire device can stand safely and stably in a predetermined position.

9. The disposable filtration device according to claim 7, wherein the holder forms a framework for a film wrapping of the device.

10. The disposable filtration device according to claim 7, wherein the holding means are provided with elastic materials.

11. The disposable filtration device according to claim 7, wherein at least six filter capsules of a standard size of at least 30" are arranged in a predetermined grid.

12. The disposable filtration device according to claim 7, further comprising a sterilized packaging.

13. A disposable filtration device, comprising a plurality of disposable filter capsules connected with each other by lines, which are carried by a rigid holder;
wherein the holder protrudes beyond the filter capsules and the lines in all directions, wherein the disposable filtration device is limited to a single use, and wherein the disposable filtration device is sterilized prior to the single use;
wherein the holder comprises a first pair of opposed side walls and a second pair of opposed side walls, each of the first pair of opposed side walls and the second pair of side walls is connected with each other by a first transverse strut near corresponding first ends of the opposed side walls and by a second transverse strut near corresponding second ends of the opposed side walls, holding means formed in each of facing surfaces of a corresponding pair of first transverse struts and of a corresponding pair of second transverse struts defining opposed surfaces partially surrounding and contacting only opposed lateral portions of each of the filter capsules for securing the filter capsules positioned between the corresponding pair of first transverse struts and the corresponding pair of second transverse struts thereby.

14. The disposable filtration device according to claim 13, wherein the lines between the filter capsules at least for the most part are formed as rigid conduits.

15. The disposable filtration device according to claim 13, wherein the lines between the filter capsules at least for the most part are formed by several uniform inflow and outflow units.

16. The disposable filtration device according to claim 15, wherein the inflow and outflow units each include an inflow device and an outflow device, which are connected with an end-face inflow and an opposite end-face outflow of an associated filter capsule.

17. The disposable filtration device according to claim 16, wherein the inflow device and the outflow device at least for the most part are identically constructed.

18. The disposable filtration device according to claim 16, wherein the inflow device and the outflow device are connected with each other by a housing wall.

19. The disposable filtration device according to claim 15, wherein the inflow and outflow units are joined to one unit by connection components which are mounted on external connections of the inflow and outflow units.

* * * * *